June 8, 1954     O. T. FUNDINGSLAND     2,680,821
MODULATOR PROTECTION CIRCUIT

Filed Nov. 13, 1945

INVENTOR
OSMUND T. FUNDINGSLAND

BY *Ralph L Chappell*
ATTORNEY

UNITED STATES PATENT OFFICE 2,680,821

MODULATOR PROTECTION CIRCUIT

Osmund T. Fundingsland, Arlington, Mass., assignor, by mesne assignments, to the United States of America as represented by the Secretary of the Navy Application November 13, 1945, Serial No. 628,284

6 Claims. (Cl. 307—106)

This invention relates to line type modulators and more particularly, to a shunt circuit for protection against sparking magnetrons.

Magnetron sparking is equivalent to an intermittent short-circuited load condition, and when a spark occurs, electrical energy which normally would be absorbed by the magnetron is reflected back into the modulator circuit. This post-pulse inverse charge causes voltage and current transients which may exceed ratings of the modulator components and the magnetron.

The present invention accomplishes the desired control of transient voltages by providing a low impedance rectifying circuit shunting the pulse forming network of the modulator to dissipate the energy of the post-pulse inverse charge before the next charging cycle is seriously influenced.

An object of this invention is to provide a circuit for reversing the post-pulse inverse charge on a pulse forming network of a line type modulator and for dissipating the energy therein.

Another object is to provide a method for discharging the post-pulse inverse charge on a pulse forming network.

Another object is to provide transient voltage regulation of the power supplied to a magnetron (or other oscillator load) by a line type modulator, against disturbances caused by sparking magnetrons.

Another object is to protect modulator components against damage by excessive voltages.

These and other objects and features of this invention will become apparent upon consideration of the following detailed description when taken together with the accompanying drawings, the figures of which illustrate a typical embodiment of this invention.

Figure 1:
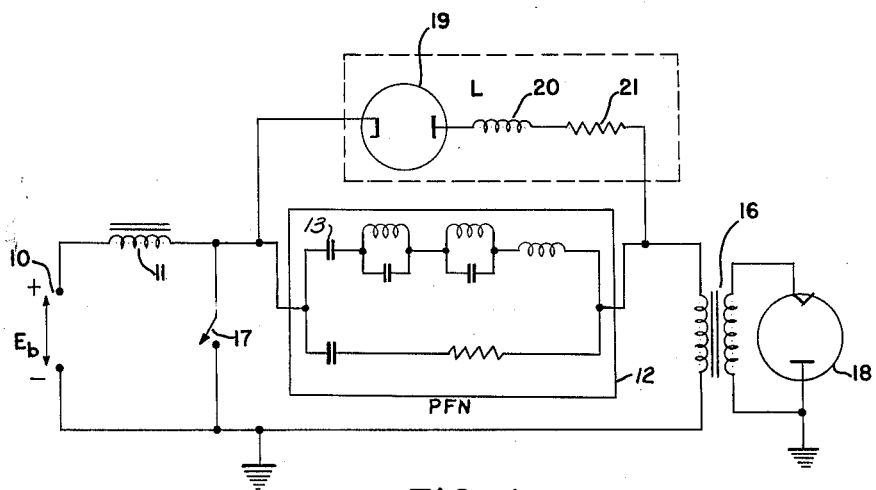
Fig. 1 illustrates a line type modulator with a protective circuit shunting the pulse forming network, hereinafter referred to as PFN.

In Fig. 1, a source of D. C. power 10 of potential $E_b$ is in a series loop with the charging choke 11, PFN 12 and the primary of pulse transformer 16. This provides D. C. resonance charging of PFN 12. PFN 12 is illustrated as including a storage capacitor 13. Switch 17, when closed, grounds the positively charged side of PFN 12 where it connects to charging choke 11. The PFN 12 is thus discharged through the primary of transformer 16 to which is reflected the load of the magnetron 18 which is connected in series with the secondary of transformer 16. Across the PFN 12, there is shunted in series the diode 19, the inductor 20, and the resistor 21. The cathode of 19 connects to the junction of choke 11 and PFN 12 so that the shunt circuit passes no current in the forward charging direction of the PFN 12.

Figure 2:
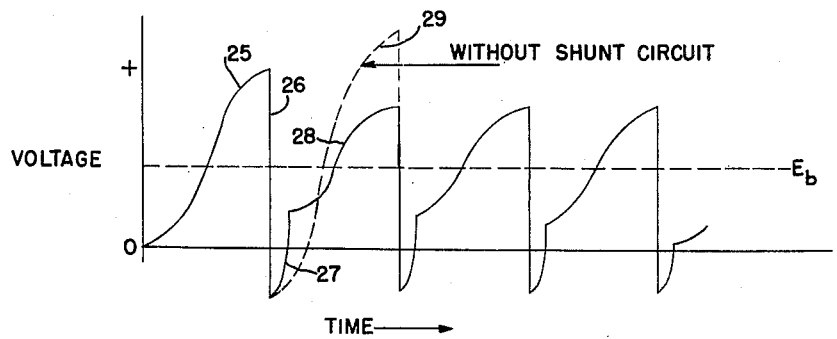
Fig. 2 illustrates the wave form of the voltage across the PFN as it would be with and without the protective circuit.

In Fig. 2, wave form 25 depicts the normal charging of PFN 12 from an initial zero charge. The peak reached is approximately $2E_b$ or twice the voltage of source 10. At the closing of switch 17 the modulator is pulsed and the voltage on PFN 12 drops sharply towards zero as shown by the wave edge 26. If the magnetron sparks or if a short occurs in the pulse transformer 16 or elsewhere in the output circuit and drops the load on the modulator, the reflected energy will cause wave 26 to go sharply negative and the PFN 12 will begin to charge negatively. Without the shunting circuit, the negative voltage on the PFN 12 would result in the charging voltage on the next cycle building up to a value greater than normal as shown in dotted wave 29. However, employing the shunting circuit, when a negative charge appears on PFN 12, the plate of diode 19 is positive with respect to the cathode and conduction begins. This places inductor 20, the resistor 21, and the storage capacitor 13 of PFN 12 in a loop circuit and a damped oscillatory circuit is formed. The discharge period of this circuit is large compared to the pulse duration but short compared to the interpulse charging period so that the resonant circuit again reverses the voltage on PFN 12 as shown in the wave form section 27. As shown in Fig. 2, the next cycle of charging of the PFN 12 begins with its origin in a positive voltage region so that during the cycle the PFN 12 is charged to a correspondingly lower voltage as shown in 28.

The resistor 21 functions to limit the peak current through the diode as well as to dissipate the energy in the inverse charge. At the same time it limits the amplitude of the reversing swing 27 of the voltage of the PFN 12 into the positive voltage region and lengthens the period of the resonant circuit. For a particular value of the capacitor 13, values of the resistor 21 and the inductor 20 can be determined so that the reversing swing 27 is of such a period and amplitude that normal charging of the PFN 12 occurs on the next cycle. In other words, the protective circuit provides perfect voltage regulation for the sparking condition regardless of otherwise poor power supply regulation.

Although there is shown and described only a certain specific embodiment of this invention as a modulator protection circuit, the many modifications possible thereof will be readily apparent to those familiar with the art. Therefore, this invention is not to be limited except insofar as is necessitated by the prior art and the spirit of the appended claims.

What is claimed is:

1. In a line type modulator including a pulse forming network having a storage capacitor, a diode, a resistor and an inductor in series shunted across said network, said diode being so connected as to conduct upon post-pulse inverse charging of said network, said resistor being such in value as to dissipate the energy of said inverse charge, and said capacitor, said resistor and said inductor being of such value that the period in which said inverse charge is reversed and the energy dissipated is short relative to the charging period of said modulator and is long relative to the duration of the pulse.

2. In a line type modulator including a capacitor for pulse storage, a rectifier, a resistor and an inductor in series connected across said capacitor, said rectifier being so connected as to shunt from said capacitor the post-pulse inverse charge, said resistor dissipating the energy of said inverse charge, and said capacitor, said resistor and said inductor being of such value that the period in which said inverse charge is reversed and the energy dissipated is short relative to the charging period of said modulator and is long relative to the duration of the pulse.

3. In a pulse modulation system, a pulse forming network, a charging source for said network, means shunting said network and connected for conduction upon post-pulse inverse charging of said network, said means during conduction therethrough resonating said network to reverse said inverse charge to the same polarity as said charging source and means to dissipate the energy of said post-pulse inverse charge.

4. Apparatus for regulating the voltage of a pulse modulation system by dissipating the energy of post-pulse inverse charges on the storage capacitor of a pulse-forming network comprising an inductive circuit, means to shunt said inductive circuit around said network upon post-pulse inverse charging of said network, said inductive circuit forming a resonant loop with said network upon conduction to reverse the polarity of said inverse charge, and means to dissipate the energy of said inverse charge in said inductive circuit.

5. Apparatus for regulating the voltage of a pulse modulation system comprising a pulse forming network having a storage capacitor, an inductive circuit, means to shunt said inductive circuit around said network upon post-pulse inverse charging of said network, said inductive circuit forming a resonant loop with said network, said resonant loop resonating at a period to reverse said post-pulse inverse charge at the beginning of the charging cycle of said network, and means to dissipate the energy of said inverse charge in said inductive circuit.

6. In a line type pulse modulator employing a unidirectional switch and direct current resonant charging of a storage capacitor of a pulse forming network, a voltage regulating circuit shunted across said network including a rectifier, a resistor and an inductor connected in series, said rectifier being so connected as to conduct upon post-pulse inverse charging of said network, said resistor and said inductor forming with said capacitor a resonant loop to reverse said post-pulse inverse charge, and said resistor being such in value as to dissipate substantially the energy of said inverse charge.

References Cited in the file of this patent

UNITED STATES PATENTS

| Number | Name | Date |
|---|---|---|
| 1,966,077 | Nyman | July 10, 1934 |
| 2,235,385 | Rava | Mar. 18, 1941 |